(12) United States Patent
Hulick et al.

(10) Patent No.: US 6,456,247 B1
(45) Date of Patent: Sep. 24, 2002

(54) HOUSING CAP FOR A HANDHELD COMPUTER

(75) Inventors: Troy Hulick, Saratoga; Kenneth A. Jenks, Capitola; Steven Shiozaki, Belmont; May Tsoi, Fremont, all of CA (US)

(73) Assignee: Palm, Inc., Santa Clara, CA (US)

( * ) Notice: Subject to any disclaimer, the term of this patent is extended or adjusted under 35 U.S.C. 154(b) by 0 days.

(21) Appl. No.: 09/832,773

(22) Filed: Apr. 10, 2001

(51) Int. Cl.[7] .................................................. H01Q 1/24
(52) U.S. Cl. ........................ 343/702; 343/872; 343/895; 345/168; 361/683
(58) Field of Search .......................... 343/700 MS, 702, 343/721, 872, 895; 345/168, 179; 361/683, 684, 686; H01Q 1/24

(56) References Cited

U.S. PATENT DOCUMENTS

| | | | | |
|---|---|---|---|---|
| 5,555,157 A | * | 9/1996 | Moller et al. | 361/683 |
| 5,574,625 A | * | 11/1996 | Ohgami et al. | 361/684 |
| 5,805,416 A | * | 9/1998 | Friend et al. | 361/686 |
| 5,946,194 A | | 8/1999 | Dudas et al. | 361/737 |
| 6,262,716 B1 | * | 7/2001 | Raasch | 345/168 |
| 6,295,031 B1 | | 9/2001 | Wallace et al. | 343/702 |
| 6,317,313 B1 | * | 11/2001 | Mosgrove et al. | 361/680 |
| 6,344,848 B1 | * | 2/2002 | Rowe et al. | 345/179 |

* cited by examiner

*Primary Examiner*—Tho G. Phan
(74) *Attorney, Agent, or Firm*—Van Mahamedi; Hickman Palermo Truong & Becker LLP

(57) ABSTRACT

A housing cap is provided for a handheld computer. The housing cap includes a structure having a length extending along a first axis and a height extending along a second axis. The structure includes a first exterior surface, a first strip and a second strip. The first exterior surface extends along the first axis, the first strip and the second strip each extending along the first axis and having a thickness. The first strip is dimensioned to adjoin an interior of the first exterior shell. The second strip is dimensioned to adjoin an interior of the second exterior shell. The structure includes an interior partially enclosed by the first exterior surface. The first strip and the second strip form an opening extending along the length of the housing cap opposite to the exterior surface. The opening is dimensioned to accommodate an antenna element and a segment of the frame for the handheld computer.

25 Claims, 11 Drawing Sheets

HOUSING CAP FOR A HANDHELD COMPUTER

BACKGROUND OF THE INVENTION

1. Field of the Invention

This invention relates to the field of handheld computers. In particular, the invention relates to features for a housing of a handheld computer.

2. Description of the Related Art

Handheld computers are becoming more diverse in function and design. The handheld computer models that are widely used come in established housings and designs. The components of the handheld computer are sometimes made to match the established housings.

For wireless applications, handheld computers may be configured to use different kinds of antennas. Each type of antenna may plug into a different frequency or wireless transmission type. The different kinds of antennas may require different spaces within the housings of the handheld computers. When a handheld computer is designed for one type of antenna, the housing of that handheld computer may have to be modified to accommodate a new type of antenna.

SUMMARY OF THE INVENTION

An embodiment of the invention includes a midframe for a handheld computer. The midframe is configured to be coupleable to different housing caps. Each housing cap may have a different shape and/or components. The midframe enables a housing cap to be selected for the handheld computer.

Another embodiment of the invention includes a housing cap that is coupleable to the handheld computer. Each housing may be used to house components for the handheld computer, including antennas and infrared transmitters.

DETAILED DESCRIPTION

A. System Overview

Embodiments of the invention include a housing cap for a handheld computer. The housing cap may be used to house wireless communication mechanisms for the handheld computer, including infrared transmitters, receivers and antennas.

In an embodiment, the housing cap may be incorporated as part of an assembly for wireless communications. The assembly may enable wireless communications of a particular type or frequency.

In an embodiment, the housing cap is provided as a modular component or assembly that may be integrated into the housing of the handheld computer during manufacturing. Alternatively, the housing cap may be a detachable or interchangeable assembly that can be mounted on or removed from the handheld computer by a user.

Under an embodiment of the invention, antenna elements housed by caps are for enabling wireless communications that use protocols for accessing network data. For example, the antennas may facilitate wireless communications from a handheld computer using a handheld computer markup language (HDML), wireless access protocol (WAP), compact hypertext markup language (CHTML) or wireless markup language (WML).

B. Handheld Computer With Housing Cap

Figure 1:
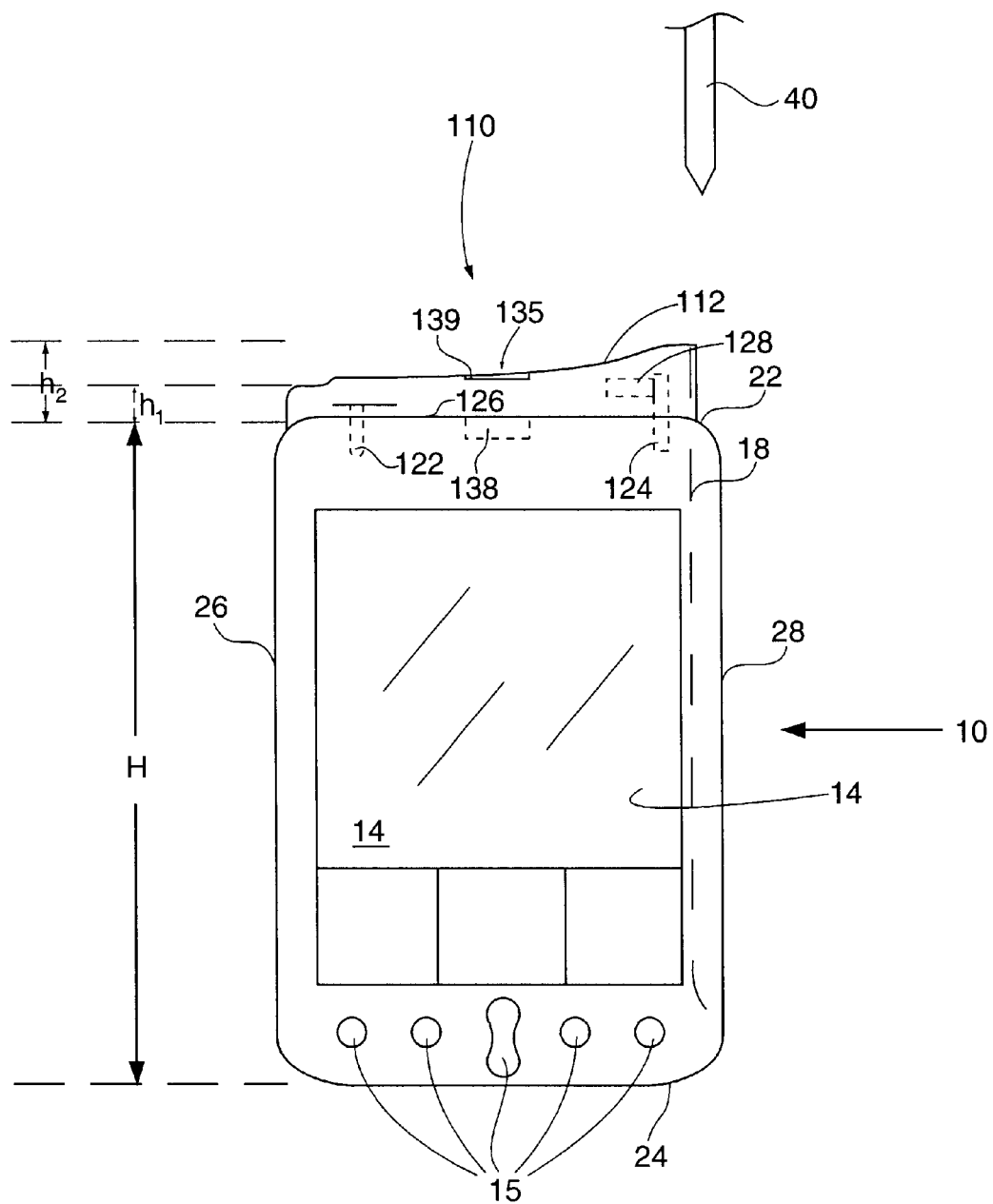
FIG. 1 is a frontal view of a handheld computer equipped with a housing cap, under an embodiment of the invention.

FIG. 1 illustrates a handheld computer 10 integrated with a housing cap 110, under an embodiment of the invention. The handheld computer includes a display 14 and a plurality of buttons 15. The display 14 may be touch-sensitive, and operable with a stylus 40. A height H of the handheld computer 10 extends between a top end 22 and a bottom end 24. An accessory slot 18 extends from the top end 22 towards the bottom end 24. The accessory slot 18 is dimensioned to slideably receive and retain stylus 40.

The housing cap 110 extends upwards from top end 22 of handheld computer 10. The housing cap 110 may be dimensioned for particular types of antennas and wireless receivers. In an embodiment shown, the housing cap 110 is dimensioned to retain smaller wireless antenna receivers. A top surface 112 of housing cap 110 is contoured, having a first height h1 adjacent to first lateral side 26, and a second height h2 adjacent second lateral side 28. The contour of top surface 112 is so that h1 is less than h2. A first end 128 of housing cap 110 may be configured to slideably receive and retain stylus 40 in cooperation with the accessory slot 18. The first end 128 may be configured by shaping a contoured or partially-circular opening onto the first end 128 in alignment with accessory slot 18.

The housing cap 110 may house a pair of chip antenna elements. A first chip antenna element 122 is for send and receiving wireless communications. The first chip antenna 122 is coupled to a printed circuit board (PCB) of handheld computer 10 via a first trace element 126. A second chip antenna element 124 is for receive only communications. The second chip antenna 124 is coupled to the PCB via a second trace element 128.

In an embodiment, housing cap 110 is integrated with an infrared port (IR)135, formed by a transmitter/receiver 138 in cooperation with an IR transmissive surface 139 on housing cap 110. Other possible features of housing cap 110 include a light indicator to provide user-feedback on a surface of the housing cap. The housing cap 110 may house or otherwise protect one, two or more light emitting diodes that visually indicate status and other feedback information.

Examples of a handheld computer for use with an embodiment of the invention includes devices operating PALM OS, including PALM PILOT, PALM V, and PALM VII devices, as well as devices such as the HANDSPRING VISOR. Other examples of handheld computer include devices operating WINDOWS CE or POCKET PC. Still further, handheld computer 10 may be a wireless phone, such as those equipped for wireless access protocol (WAP) communications.

Figure 2:
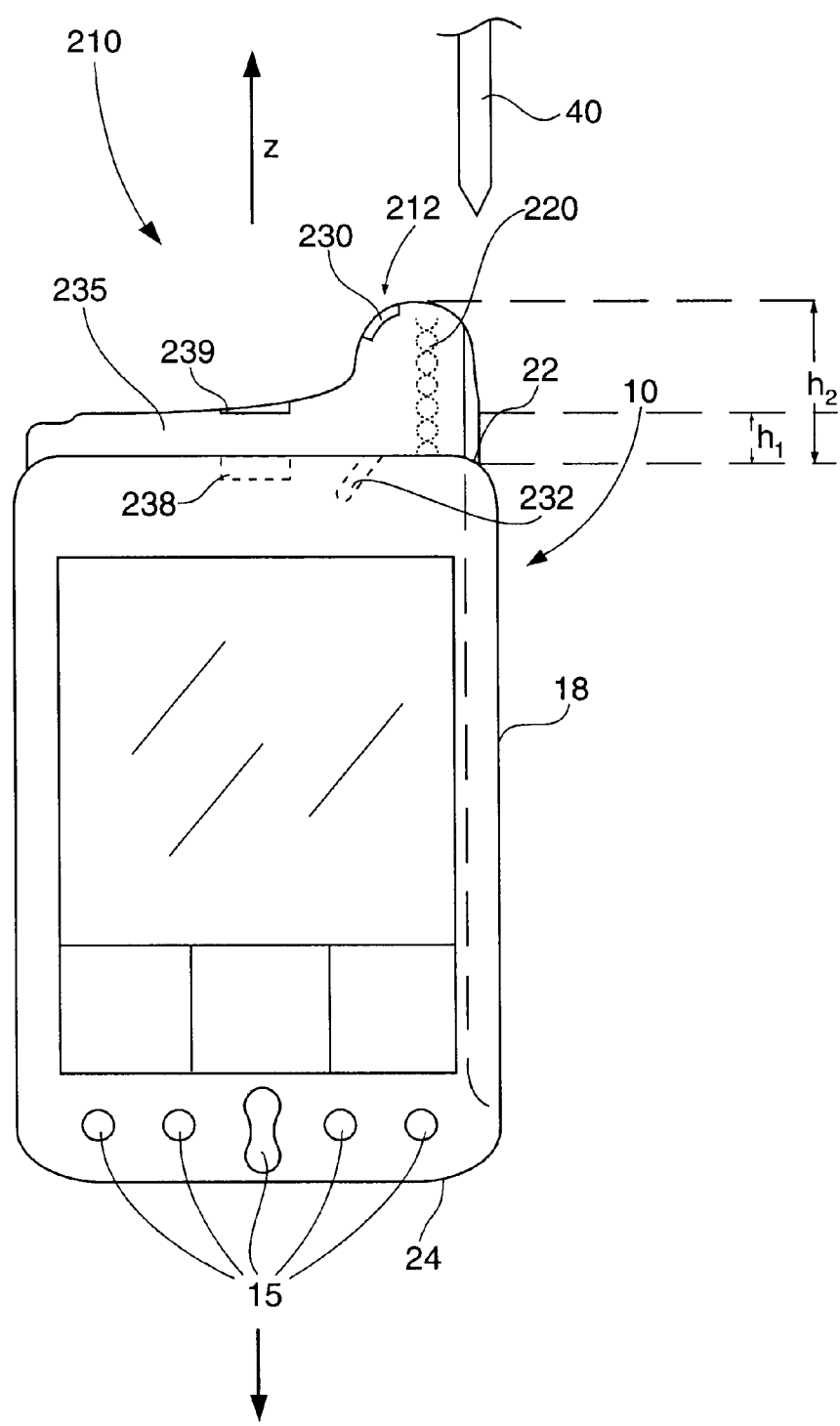
FIG. 2 is a frontal view of a handheld computer equipped with another housing cap, under an embodiment of the invention.

FIG. 2 illustrates an embodiment for housing cap 210, dimensioned for a helical antenna 220 components. The housing cap 210 includes a bulbous portion 212 to house the helical antenna 220, which is more spacious than the chip antenna elements described with FIG. 1. A light indicator 230 is integrated into housing cap 210 to provide visual feedback. The light pipe 232 operates in cooperation with a light pipe 232. The light indicator 230 is mounted to the PCB of the handheld computer 10, and may comprise one or more light emitting diodes, such as red and/or green. The extra height provided by the bulbous portion 212 may be used to enhance the presence of the light indicator 230. A transmissive surface 239 is provided on the top exterior surface for enabling IR communications. A contour of bulbous portion 212 enhances the presence of light indicator 230, especially with regard to enabling the light indicator 230 to be viewable from two axial directions. In the example provided, the light indicator 230 is viewable from a top direction Z, and a front direction Y (out of paper) that is normal to the Z.

In addition to light indicator 230, housing cap 210 may enclose an infrared port. In an embodiment, housing cap 210 is coupled to a top portion of the PCB, where light indicator 230, helical antenna 220 and the IR port are integrated.

C. Housing Cap

Figure 3:
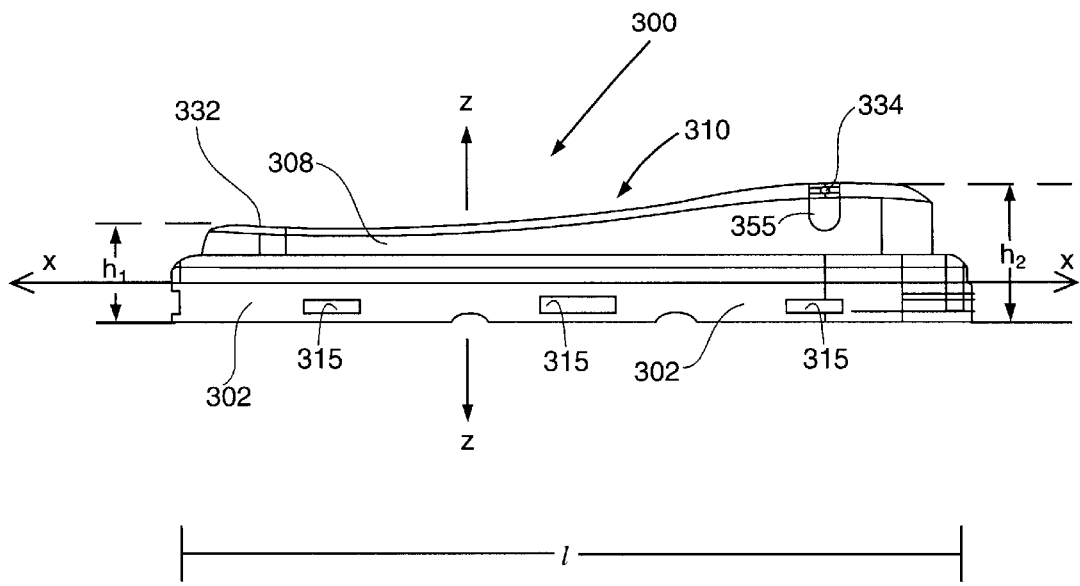
FIG. 3 is a front side view of a housing cap, under an embodiment of the invention.

FIG. 3 is a front view of housing cap 300, under an embodiment of the invention. The housing cap 300 includes a structure 310, preferably formed as one-piece. One or more apertures, openings and surfaces may be formed or integrated into structure 310 to provide for features such as IR communications and feedback mechanisms. In the alternative, housing cap 300 combines or otherwise integrates structure 310 with surfaces and components for IR communications and feedback. The structure 310 includes a length l extending along an axis X, a first height h1' and a second height h2' extending along axis X. Due to the shape of structure 310, h1' is greater than h2'.

The front of housing cap 300 includes a first strip 302. With reference to an orientation shown in FIGS. 1 and 2, first strip 302 may be a portion of a first vertical face 308, extending the structure 310 along axis Z. The remainder of first vertical portion 308 may be contoured from first strip 302. As will be described with FIG. 14, first strip 302 is configured to be adjoined with a corresponding surface on a housing of handheld computer 10. To this end, strip 302 is preferably smooth, flat and dimensioned to be coupled to a corresponding edge piece on an interior side of an exterior panel for the handheld computer 10. Thus, a thickness of strip 302 measured along Z may match a thickness allocated on the interior surface of an exterior panel for handheld computer 10. The strip 302 may provide for fasteners. In an embodiment, a plurality of apertures 315 for receiving fasteners are provided for securing the strip 302 with the interior side of the panel for handheld computer 10.

A top exterior surface 330 is contoured as it extends along the length. A first end 332 of top exterior surface 332 is at height h1'. A second end 334 of top exterior surface 334 at h2'[. The resulting contour of top exterior surface 330 provides space for housing an antenna element. In an embodiment shown, the contour provides space for a chip antenna element extending from the PCB of handheld computer 10, as shown and described with FIG. 1.

An opening 355 for a status light indicator 355 is provided on first vertical face 308. As shown with FIG. 5, opening 355 for status light indicator may also extend over top exterior surface 330. In this way, the status light indicator is viewable from two directions (or from two axes). For example, a user can view the light indicator when viewing housing cap 300 from the front (or in a direction into the paper). In addition, the user can view the light indicator when viewing top surface 330 along axis Z.

Figure 4:
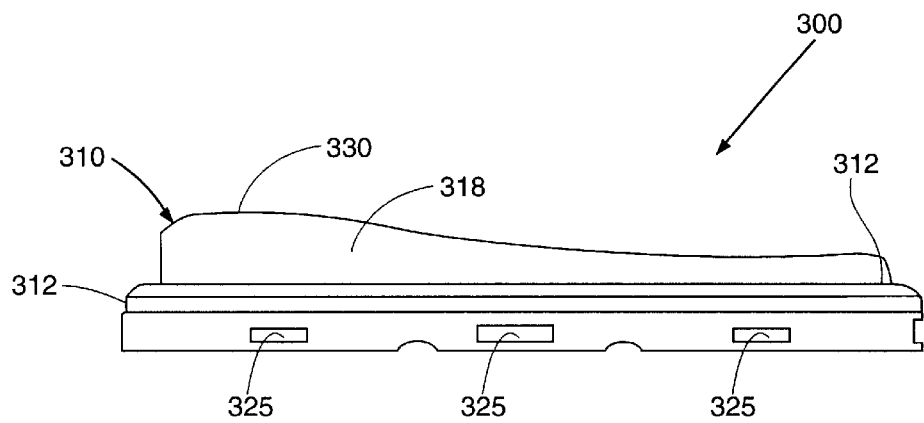
FIG. 4 is a back side view of the housing cap in FIG. 3.

FIG. 4 is a back view of housing cap 300, illustrating a second vertical face 318 opposing the first vertical face 308. A second strip 312 is provided on the second vertical face 318. The second strip 312 may be located a same distance along axis Z from top exterior surface 330 of housing cap 300. As with the other side, strip 312 includes a plurality of apertures 325 for receiving fasteners to couple the housing cap 300 to an interior side of an exterior panel for handheld computer 10.

Figure 5:
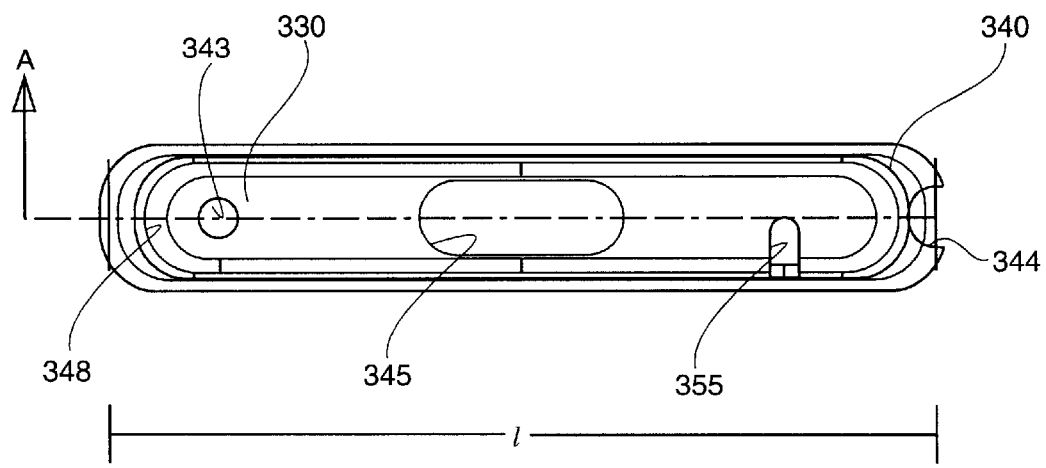
FIG. 5 is a top view of the housing cap in FIG. 3.

FIG. 5 is a top view of housing cap 300, showing top exterior surface 330 having a first opening 345 for IR communications, and a second opening 355 for providing a light indicator. A third opening 343 may be used for providing an audio jack or other media outlet. A first end portion 340 of structure 310 includes a contoured or semi-circular opening 344 to receive stylus 40 (See FIG. 1). The opening 344 aligns with accessory slot 18 of handheld computer 10. In this way, opening 344 slideably receives stylus 40 to store a portion of it alongside handheld computer 10. A second end portion 348 opposes first end portion 340 across length l.

Figure 6:
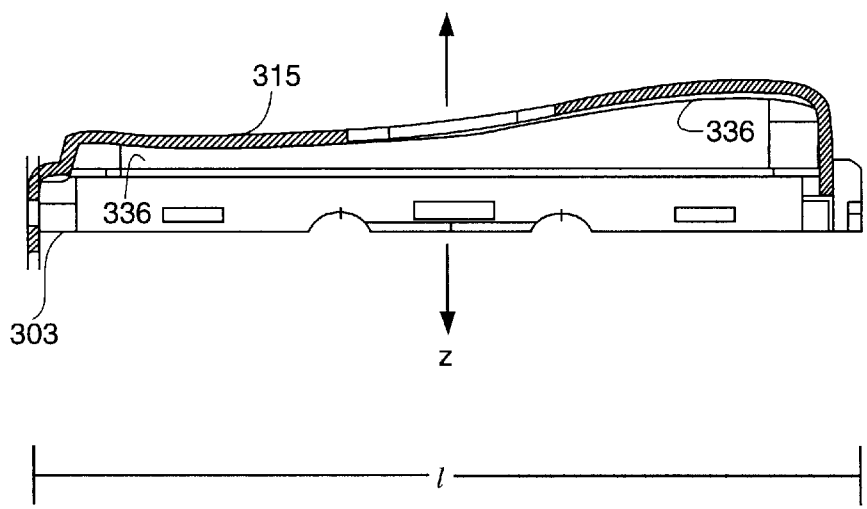
FIG. 6 is a cross-sectional view of the housing cap in FIG. 5, cut along lines A—A.

FIG. 6 is a cross-sectional view along lines A—A of FIG. 5, illustrating an interior space 336 of housing cap 300. The structure 310 comprises a shell 315 formed of unitary structure, preferably through molded plastic. An opening 346 provides access to interior space 336 from a bottom 303 of structure 310, along axis Z. As shown, interior space 336 is partially defined by first vertical face 308, second vertical face 318, and top exterior surface 330. The dimensions of interior space 336 may match the contour of top exterior surface 330, so that a depth of interior space 336 as measured along axis Z increases across length l.

Figure 7:
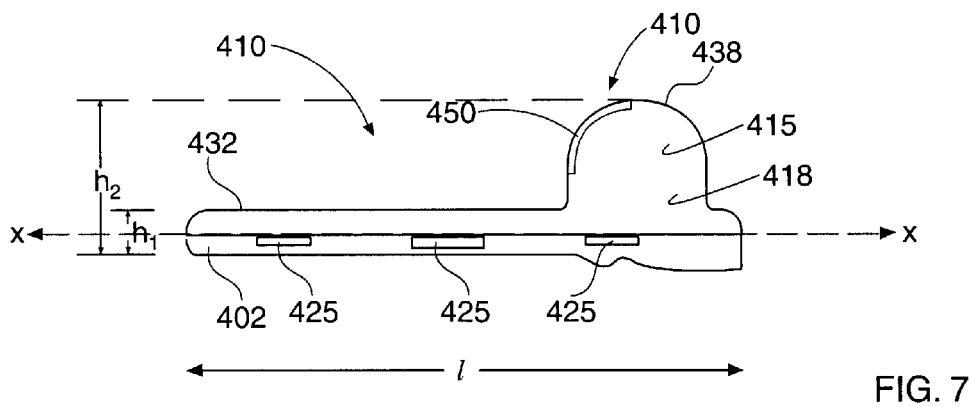
FIG. 7 is a front side view of a housing cap, under another embodiment of the invention.
Figure 8:
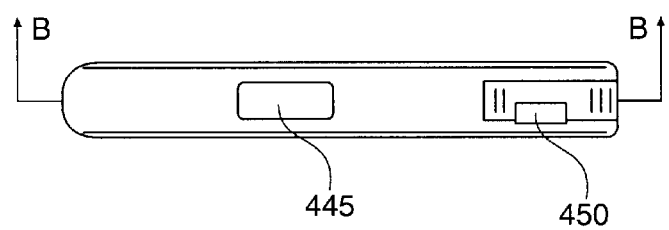
FIG. 8 is a top view of the housing cap in FIG. 7.
Figure 9:
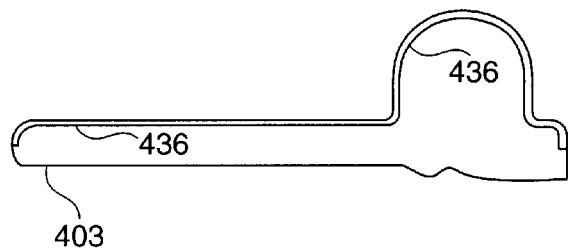
FIG. 9 is a cross-sectional view of the housing cap cut along lines B—B of FIG. 8.

FIGS. 7–9 illustrates a housing cap 400 including a structure 410, under another embodiment of the invention. The structure 410 includes a bulbous section 415. FIG. 7 is a front view of housing cap 400. The structure 410 is configured to mount to the top end 22 of handheld computer 10. As such, housing cap 400 is assumed to have approximately the same length l as an embodiment described with FIGS. 4–6. Thus, either housing cap 300 (FIGS. 4–6) or 400 (FIGS. 7–9) may be used with handheld computer 10. In an embodiment, housing caps 300, 400 may be modular, or interchangeable during the assembly or manufacturing process for handheld computer 10. In another embodiment, the housing caps 300, 400 are interchangeable by a user of the handheld computer 10.

A first strip 402 extends the length l of structure 410. A first vertical portion 418 includes first strip 402 and extends along axis Z towards a top exterior surface 430. A contour of top exterior surface 430 provides for bulbous section 415. A first end 432 of exterior surface 430 is measured to be a distance h1 from a bottom 403. A second end 438 of exterior surface 430 is measured to be a distance h2 from bottom 403. The bulbous portion 415 provides h2 is greater than h1. The difference between h2 and h1 is also larger for structure 410 than for structure 310 (FIGS. 4–6).

The strip 402 is configured to be coupled and/or adjoined to an interior surface of an exterior panel for handheld computer 10. Thus, strip 402 is preferably of a uniform thickness (along axis Z) and smooth. In addition, strip 402 may include a plurality of apertures 425 to receive fasteners that secure structure 410 to handheld computer 10.

In an embodiment, bulbous portion 415 is coupled to a status light 450. The status light 450 may be illuminated by one or more diodes housed within housing cap 400, and preferably mounted onto PCB for handheld computer 10. The status light 450 is viewable from multiple axes or directions. For example, status light 450 may include a portion parallel to axis X, and another portion parallel to axis Z.

FIG. 8 is a top view of housing cap 400. As shown, status light indicator 450 is viewable from axis Z. In an embodiment, housing cap 400 may include a surface 445 for IR communications. The surface 445 may be transmissive to IR communications. Alternatively, surface 445 may be replaced by an opening, which provides access to an interior structure for enabling IR communications. In this embodiment, the opening may cooperate with an internal structure that is transmissive to IR. Further description of this embodiment is provided with FIGS. 10 and 11.

FIG. 9 is a cross-sectional view of housing cap 400, cut along lines B—B of FIG. 7. An interior space 436 is extended in the bulbous region 415, providing an extended depth for interior space 436. The enlarged depth facilitates housing a helical antenna element for wireless communications from handheld computer 10.

D. Cap Assembly for Wireless Communications

An embodiment of the invention includes a housing cap assembled with an interior structure for enabling IR communications. The IR communications may be provided in addition to an antenna element that is housed within the housing cap. The housing cap assemblies may also include a status light indicator for signaling feedback to users.

Figure 10:
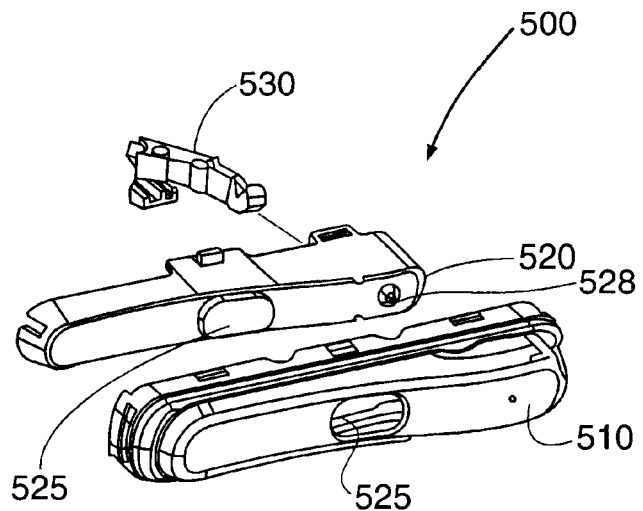
FIG. 10 is a first isometric view of a housing cap assembly equipped for infrared communications, under an embodiment of the invention.

FIG. 10 illustrates a cap assembly 500 comprising a housing cap 510 combined with an interior structure 520. The cap assembly includes a light pipe 530, housed within the structure formed by the combination of the housing cap and interior structure 520. The housing cap 510 includes a first opening 515 for IR communications, and a second opening (not viewable) to receive light pipe 530. The interior structure 520 includes an IR surface 525 that aligns with the opening 515 of housing cap 510. The IR surface 525 is transmissive to IR signals. In addition, interior structure 520 includes an opening 528 that is aligned to receive light pipe 530, and to extend the light pipe into cap 510.

Figure 11:
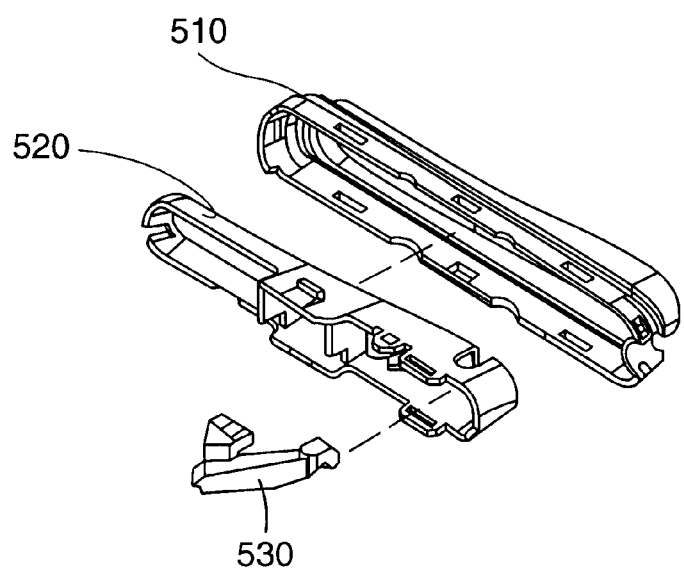
FIG. 11 is a second isometric view of the housing cap in FIG. 10.

FIG. 11 is a top isometric view of cap assembly 500. The interior structure 520 includes an interior space for housing light pipe 530. The confines of housing cap 510 partially enclose interior structure 520. The interior structure 520 may be coupled to the PCB of handheld computer 10. An IR communicator (transmitter/receiver) may be mounted to the PCB to signal and/or receive IR communications. To enable IR communications, surface 525 (FIG. 10) and first opening 515 (FIG. 10) are aligned over the IR communicator on the PCB.

In an embodiment, interior structure 520 is of uniform construction. The interior structure 520 may be formed of an IR transmissive material. The IR communications can be extended from the IR communicator 560 (assumed to be housed within interior structure 520) through surface 525 and across opening 525.

Alternatively, interior structure 520 may be clear, or surface 525 may be replaced with an opening. The housing cap 510 is then formed at least partially from IR transmissive material. The first opening 525 may be replaced with an IR transmissive surface to enable IR communications to be extended through the cap assembly 500.

Still further, another embodiment may combine housing cap 510 and interior structure 520 into one structure. The structure may be formed from IR transmissive material to enable IR communications to be extended to the IR communicator 560.

E. Modular Housing Cap and Handheld Computer Assembly

In an embodiment, a modular housing cap is provided for a handheld computer. The modular housing cap implies that the housing cap is interchangeable amongst multiple designs, with a particular housing cap being selected for integration with the handheld computer during a manufacturing or assembly process. The housing for the handheld computer may be configured to couple to the housing cap during the manufacturing or assembly process. In particular, a portion of the housing may be equipped to receive any one of a plurality of housing caps during an assembly process.

Figure 12:
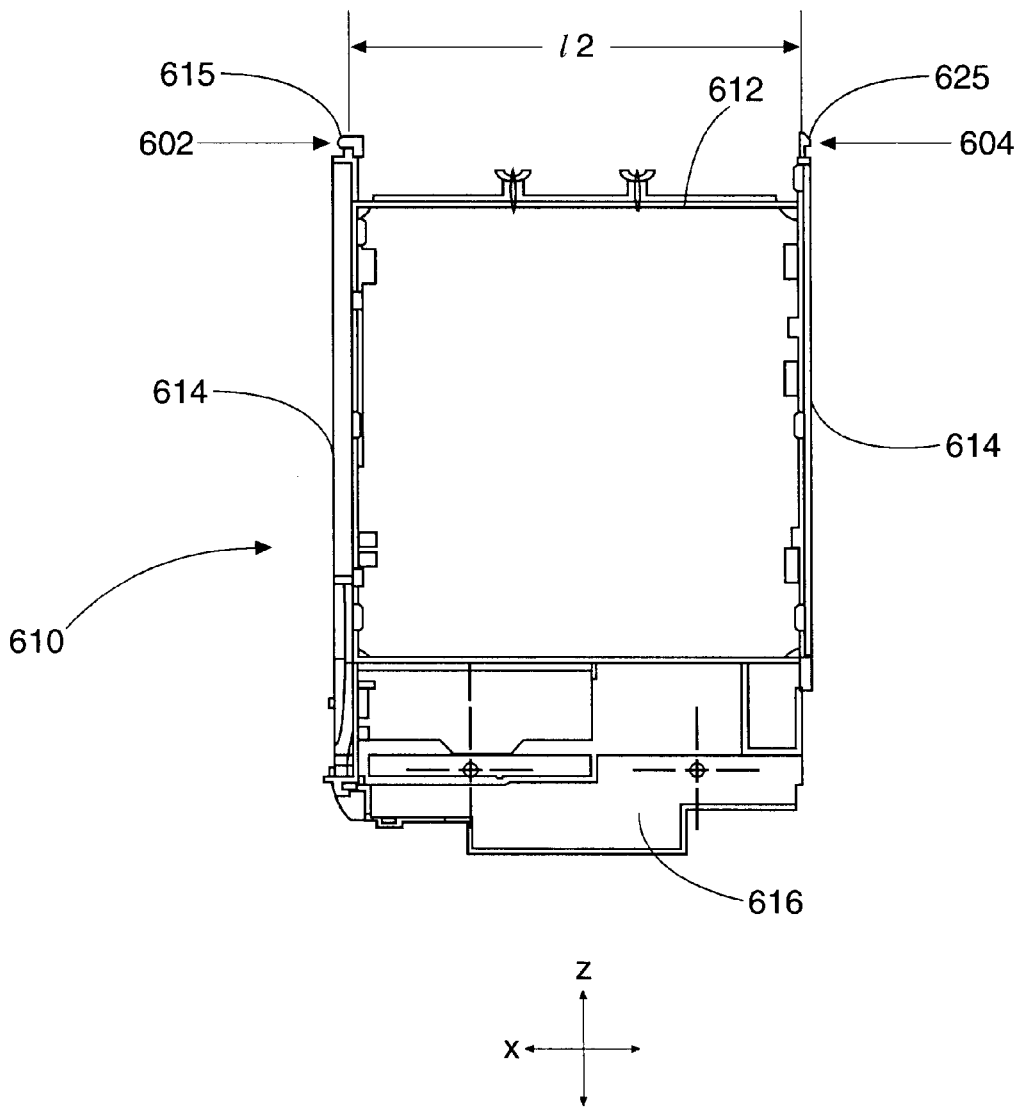
FIG. 12 is a front view of a midframe, under an embodiment of the invention.

FIG. 12 illustrates a midframe 610 as the housing segment, configured to be attached to one of a plurality of housing caps, such as shown by housing cap 300 (FIGS. 3–6) and 400 (FIGS. 7–9). The midframe forms a middle peripheral section of the housing for the handheld computer 10. That is, midframe 610 is sandwiched between exterior shells or portions of the housing for handheld computer 10. The midframe 610 may be of a unitary construction, such as may be formed with molded plastic.

The midframe 610 has a top perimeter 612, a pair of lateral sides 614, and a base 616. When assembled, midframe 610 may be referenced with the axes X and Z, as used for describing the housing caps. The top perimeter 612 extends a length l2 along axis X between a first end 602 and a second end 604. The first end 602 and second end 604 in combination are configured to be coupleable and decoupleable to a plurality housing caps. The top perimeter 612 includes features for engaging a housing cap. The first end 602 includes a hook 615. The hook 615 is positioned to couple to an internal structure of housing cap 650 (see FIG. 13). At second end 604, a catch 625 is extended from the midframe. The catch 625 is positioned to engage a corresponding aperture of handheld computer 100. The midframe 610 has sufficient flexure to enable lateral sides 614 to be brought together. In this way, lateral sides 614 can be pushed towards one another to reduce the distance between the first end 602 and second end 604.

Figure 13:
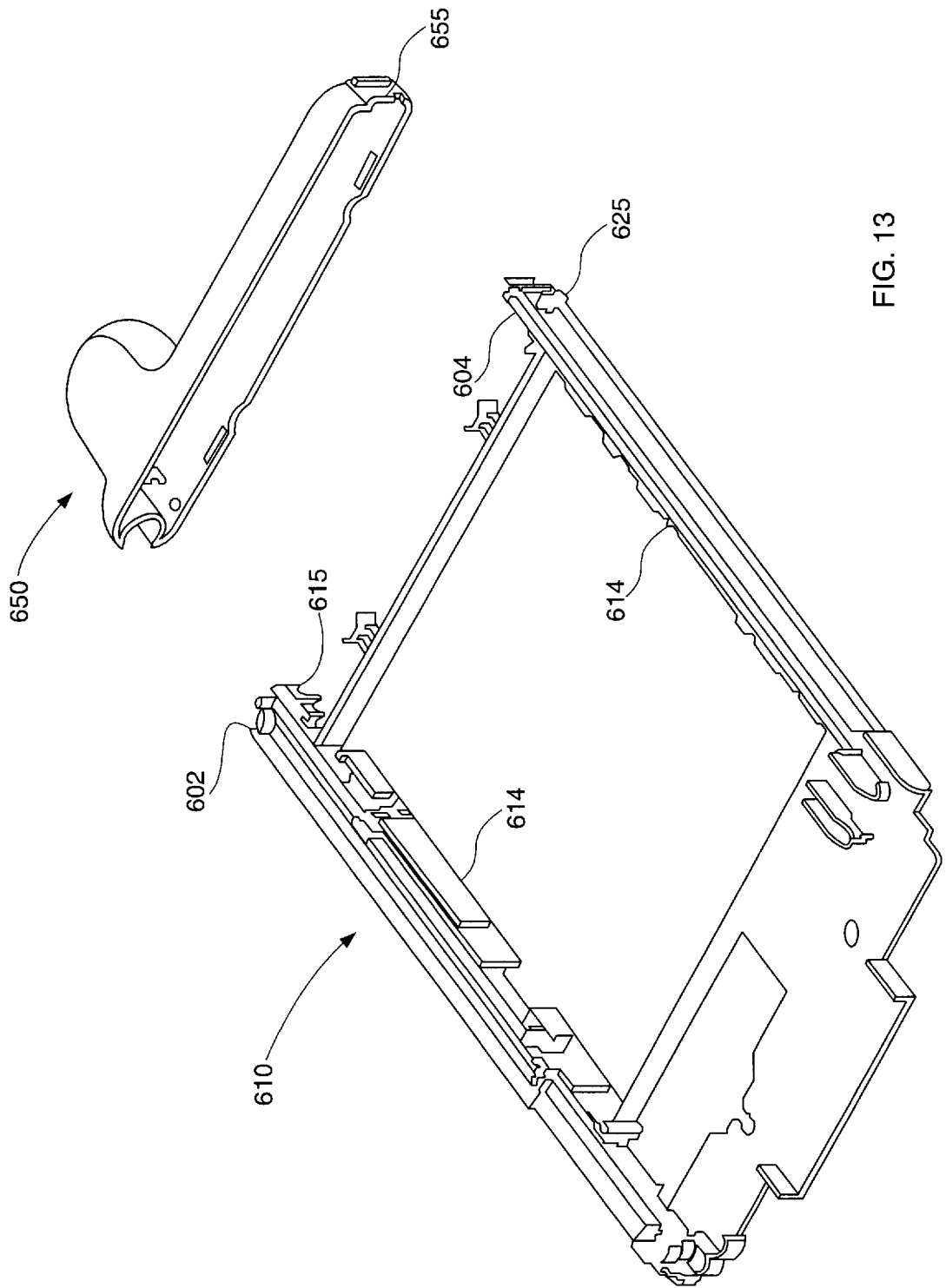
FIG. 13 is an isometric view of a midframe being coupled to a housing cap, under an embodiment of the invention.

FIG. 13 illustrates midframe 610 being aligned to be coupled with a selected housing cap 650. The housing cap 610 includes an interior coupling structure or surface to engage hook 615 when lateral sides 614 are brought together. The housing cap 650 also includes a coupling aperture 655, formed onto an exterior surface in alignment with second end 604. The catch 625 and coupling aperture 655 may be aligned to engage and coupe to one another. In an embodiment, housing cap 650 is coupled to midframe 610 by pressing lateral sides 614 together. The hook 615 is engaged and coupled to the interior coupling structure of housing cap 650. Then, the catch 625 is engaged and coupled to aperture 655. The catch 625 may be extended through aperture 655 to provide an extra range for midframe 610 to be flexed outward after being flexed inward. In this way, midframe 610 is in a biased state housing cap 650 is mounted onto it. To decouple housing cap 650 from midframe 610 lateral sides 614 are brought together. The catch 625 is then disengaged from aperture 655. The hook 615 is then disengaged from housing cap 610.

Figure 14:
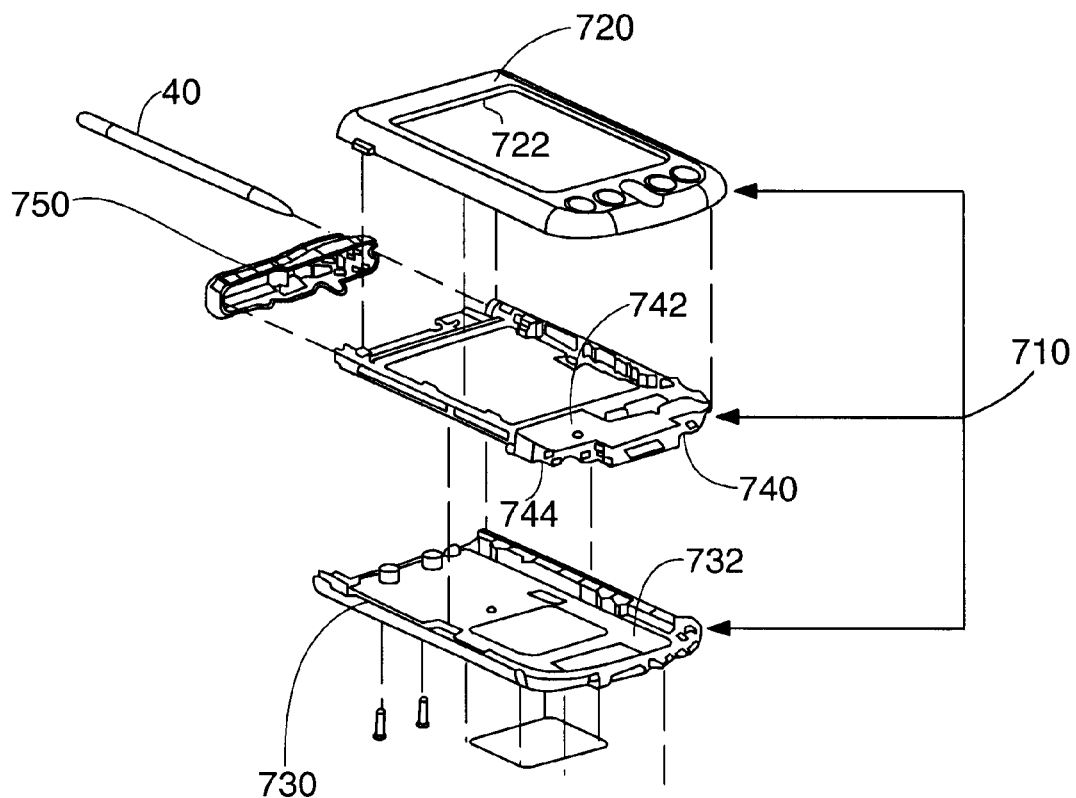
FIG. 14 is an exploded view illustrating a handheld computer being assembled with a housing cap, under an embodiment of the invention.

FIG. 14 illustrates an assembly process for integrating a selected housing cap 750 with a housing 710 for a handheld computer 700. The housing 710 includes a first exterior shell 720 and a second exterior shell 730. A midframe 740 is sandwiched between first exterior shell 720 and second exterior shell 730. The first exterior shell 720 corresponds to a front face of the handheld computer, and includes openings for providing a display and buttons for operating the handheld computer. The second exterior shell 730 corresponds to a back face of the handheld computer.

To assemble the housing 710, midframe 740 is first coupled to housing cap 750. Then, a first side 742 of midframe 740 is positioned opposite and adjacent to an interior surface 722 of first exterior shell 720. A second side 744 of midframe 740 is positioned adjacent and opposite to an interior side 732 of second exterior shell 730. Mechanical fasteners are used to couple first exterior shell 720 to midframe 740, and second exterior shell 730 to midframe 740. Mechanical fasteners may also be used to couple first exterior shell 720 and second exterior shell 730 to housing cap 750.

In an embodiment, housing cap 750 includes a construction shown by FIGS. 3–6, and FIGS. 7–9. For example, with reference to FIG. 3, strip 302 may be positioned adjacent to interior surface 722 of first exterior shell 720. The coupling apertures 315 may be aligned with corresponding apertures on first exterior shell 720 to couple the housing cap to first exterior shell. With reference to FIG. 4, strip 312 is positioned adjacent to interior surface 732 of second exterior shell 730. Mechanical fasteners then engage the coupling apertures 325 on this side of the housing cap to combine the housing cap with the second exterior shell 730.

In an embodiment, the midframe 740 and housing cap 750 each provide portions of an accessory slot. The accessory slot may be a partial-circular opening formed in one of the lateral sides of midframe 750, as well as one of the ends for housing cap 750. When housing cap 750 and midframe 740 are combined, the accessory slot is given its full length. The accessory slot may be used to receive a stylus 40 (FIG. 1), or stylus-shaped device.

In one implementation, each housing cap that can be coupled to midframe 610 has a different form factor, interior, or exterior. In another implementation, the plurality of housing caps may be assembled with different electrical components. For example, a housing cap such as shown by FIGS. 3–6 may be used for a handheld computer 10 having a chip antenna, while a housing cap such as shown by FIGS. 7–9 may be used to house a helical antenna element. As another example, one antenna cap may be equipped for use as an IR port, while another is not.

F. Removable Housing Cap Assembly for Handheld Computer

An embodiment of the invention includes a handheld computer that is configured to be coupleable to a housing cap. In particular, the handheld computer may be coupleable to any one of a plurality of housing caps. The user may select amongst housing caps, including amongst antennas for the handheld computer, and couple selected housing caps to the handheld computer as desired.

Figure 15:
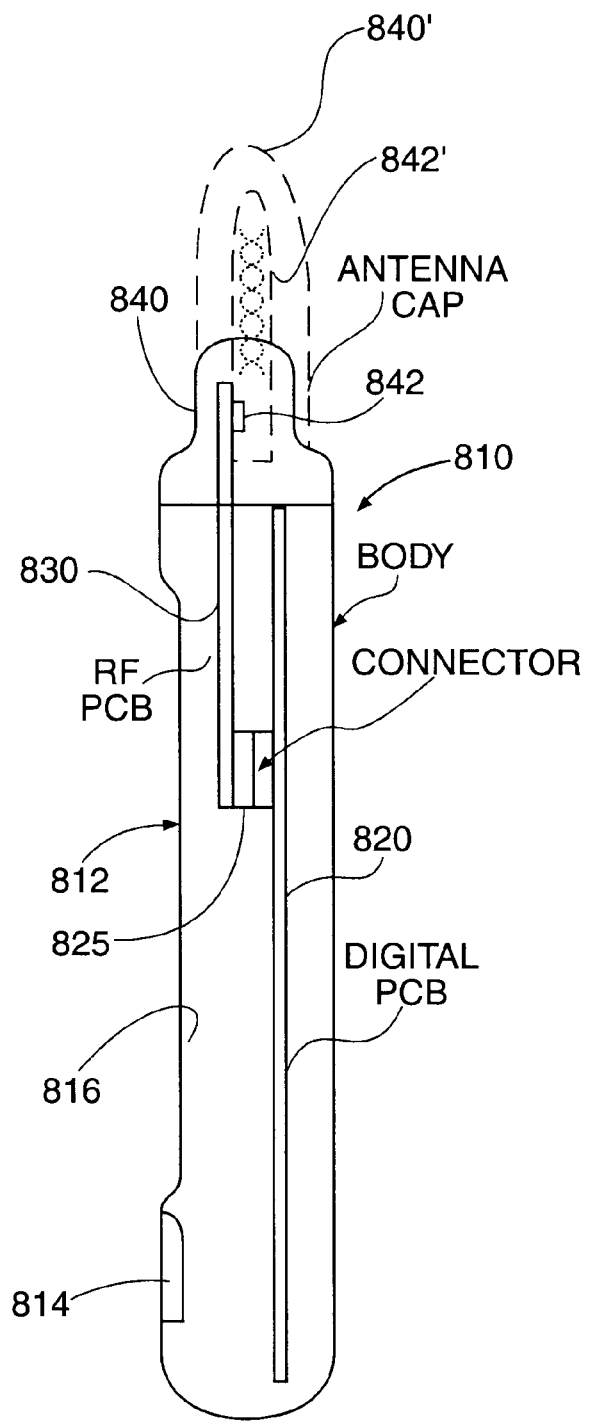
FIG. 15 is a side view of a housing cap with two printed circuit boards, for coupling to multiple types of antenna housing caps, under an embodiment of the invention.

FIG. 15 is a side view of a handheld computer 800, including a housing 810 for retaining a plurality of PCBs. The housing 810 includes a first PCB 820 and a second PCB 830. A front panel 812 of the housing 810 for the handheld computer 800 includes an opening 816 or recess for providing a display. The front panel 812 also includes buttons 814 and other input mechanisms.

A housing cap 840 is mounted on handheld computer 800. The first PCB 820 is for processing non-wireless functions, including keeping records entered by the user. The second PCB 830 includes resources for enabling wireless communications. These resources may include leads for extending antenna signals, an infrared communicator, and memory (see FIG. 16). A PCB connector 825 connects the first PCB 820 to the second PCB 830.

The second PCB 830 extends upwards beyond first PCB 820 so as to extend into housing cap 840. The housing cap 840 includes an antenna element 842 that connects to second PCB 830. In the embodiment shown, housing cap 840 is for a chip antenna. A phantom illustration of another housing cap 840' is provided to show use of a helical antenna 842' within a bulbous portion of the housing cap 840'. In an embodiment, housing cap 840 and 840' may be swapped or interchanged by a user of the handheld computer 800.

Figure 16:
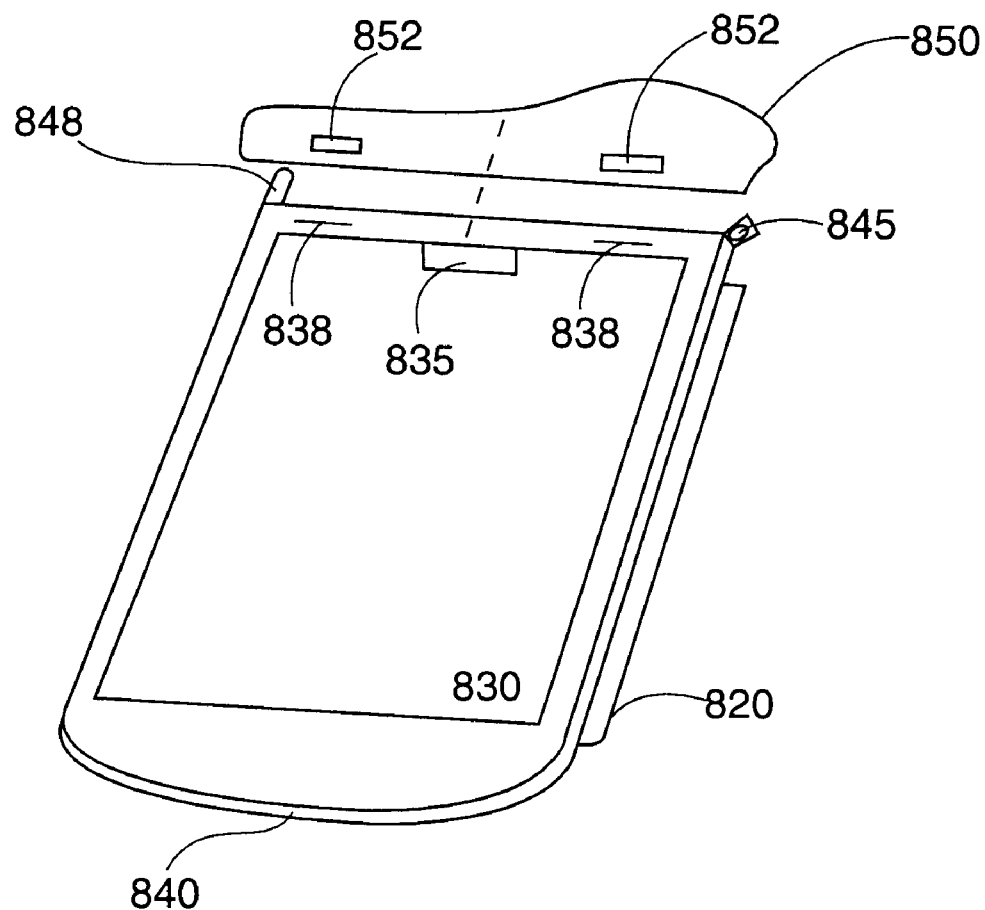
FIG. 16 is a front isometric view of a housing cap being coupled to a midframe and two printed circuit boards, under an embodiment of the invention.

FIG. 16 is a front isometric view showing first PCB 820, second PCB 830, and midframe 840. The remainder of the handheld computer is excluded from the drawing. The midframe 840 includes sufficient thickness to peripherally enclose both first PCB 820 and second PCB 830. An IR communicator 835 is provided on second PCB 830. Antenna trace elements 838 are extended from the second PCB 830. For descriptive purposes, a housing cap 850 is shown for alignment with the midframe 840. The housing cap 850 is shown to include one or more antenna elements 852. The antenna elements 852 are positioned to make contact with trace elements 838. In addition, housing cap 850 may include IR surfaces or structures to enable IR communications to be extended from IR communicator 835. Other features that may be provided include a light indicator for feedback to the user.

In an embodiment, housing cap 850 is removable, and possibly replaceable with other housing caps. Removing the housing cap 850 may enable a user to selectively reduce the size or form factor of the handheld computer. Replacing the housing cap may enable users to select housing caps with assemblies for particular uses. For example, users may select housing caps for antennas that are able to communicate at particular frequencies. For such uses, second PCB 830 may be employed.

In an embodiment, users may interchange housing caps with different types of antennas. Users may select housing cap 850 from amongst multiple types of housing caps, each of which may house specific types of antennas, different form factors and other features. This allows users to switch antennas to receive wireless services in locations that may require different antenna frequencies. To enable housing cap 850 to be coupleable to handheld computer 800, one embodiment provides that coupling features of midframe 840 be extended beyond the shells of the housing. Other embodiments may provide biased latching mechanism to couple housing cap 850 to the handheld computer.

Each housing cap 850 may be made to be interchangeable with other housing caps by adopting a uniform design for positioning IR surfaces, and leads to antenna elements housed within the housing cap 850. Thus, each housing cap 850 may be configured to provide an antenna signal to trace elements 838, through leads or positioning of actual antenna elements.

G. Other Embodiments and Variations

A housing cap under an embodiment of the invention may include an integrated light pipe coupled to a light emitting source to provide multi-level feedback. In an embodiment, a light indicator may be employed in combination with a plurality of diodes, such as a red diode and a green diode. The red diode and green diode may be coupled to the processor to receive feedback signals. Each diode may be asserted alone or in combination through the light pipe to convey a particular message to the user of the handheld computer. For example, each diode may be asserted individually, or toggled alone or together. In addition, both diodes can be asserted simultaneously to create a third color-such as orange by combining red and green.

Still, another embodiment may provide for a housing cap formed of light transparent or translucent material. In this embodiment, no aperture is required for a light indicator or light pipe. Furthermore, no integrated transparent surface is needed for providing the light pipe. Rather, a light source such as LEDs (red and green) may be contained within the translucent housing. When lighted, the LEDs are visible through the housing cap from several angles.

H. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A housing cap for a handheld computer, the handheld computer comprising a housing having a first exterior shell, a second exterior shell, and a frame positioned between the first exterior shell and the second exterior shell, the housing enclosing at least a processor and a memory, and the housing providing a display, the cap comprising:

a structure having a length extending along a first axis and a height extending along a second axis that is orthogonal to the first axis, the structure including a first exterior surface, a first strip and a second strip, the first exterior surface extending along the first axis, the first strip and the second strip each extending along the first axis and having a thickness extending along the second axis, the first strip being dimensioned to adjoin an interior of the first exterior shell, the second strip being dimensioned to adjoin an interior of the second exterior shell, the structure including an interior partially enclosed by the first exterior surface, the first strip and the second strip to form an opening extending along the length of the housing cap opposite to the first exterior surface, the opening being dimensioned to accommodate an antenna element and a segment of the frame for the handheld computer.

2. The housing cap of claim 1, wherein the first strip and the second strip each include a plurality of apertures to receive fasteners that couple the housing cap to the respective first and second exterior shells.

3. The housing cap of clam 1, wherein the structure includes a first end portion and a second end portion, the first end portion and the second end portion extending between the first strip and the second strip, the first end portion including a partially circular opening extending along the second axis and dimensioned to slideably receive a stylus.

4. The housing cap of claim 3, wherein the second end portion includes a coupling aperture to engage an extension if the frame so as to couple the housing cap to the frame.

5. The housing cap of claim 1, wherein the first exterior surface includes an opening for providing access to a wireless communications mechanism.

6. The housing cap of claim 1, wherein the structure is formed from infrared transmissive material.

7. The housing cap of claim 6, wherein the first exterior surface is formed from an infrared transmissive material.

8. The housing cap of claim 6, wherein a portion of the first exterior surface includes a polished portion for enabling infrared communications.

9. The housing cap of claim 1, wherein the first exterior surface includes an opening for a light indicator.

10. The housing cap of claim 1, wherein the first exterior surface and an adjacent surface to the first exterior surface each include an opening for a light indicator.

11. The housing cap of claim 1, wherein the first exterior surface is contoured so that a depth of the interior is variable along the length.

12. The housing cap of claim 1, wherein the first strip and the second strip are primarily linear and uniformly spaced from one another across the interior of the structure.

13. The housing cap of claim 1, further comprising a transparent surface coupled to the structure provide a light indicator that can be signaled from a diode stored within the interior of the structure.

14. The housing cap of claim 1, wherein the structure includes a bulbous section that extends from the first exterior surface.

15. The housing cap of claim 14, wherein the bulbous section includes an opening for receiving a transparent surface.

16. The housing cap of claim 15, wherein the opening for the transparent surface is formed to provide that the transparent surface includes a first thickness along the first axis and a second thickness along the second axis, the first thickness and the second thickness being visible on the handheld computer.

17. An antenna cap assembly or a handheld computer, the handheld computer comprising a housing having a first exterior shell a second exterior shell, and a frame positioned between the first exterior shell and the second exterior shell, the first exterior shell, the second exterior shell and the frame combining to house at least a printed circuit board, a processor and a memory, the housing providing a display, the antenna cap comprising:

a structure having a length extending along a first axis and a height extending along a second axis that is orthogonal to the first axis, the structure including a first exterior surface, a first strip and a second strip, the first exterior surface extending along the first axis, the first ship and the second strip each extending along the first axis and having a thickness along second axis, the first strip being dimensioned to adjoin an interior of the first exterior shell, the second strip being dimensioned to adjoin an interior of the second exterior shell, the structure including an interior partially enclosed by the first exterior surface, the first strip and the second strip to form an opening extending along the length of the housing cap opposite to the first exterior surface, the opening being dimensioned to accommodate an antenna element and a segment of the frame for the handheld computer; and said antenna element electrically coupleable to the printed circuit board and housed within the structure.

18. The antenna cap assembly of claim 17, wherein the structure includes a bulbous section that extends from the first exterior surface, and the antenna element is a helical antenna.

19. The antenna cap assembly of claim 17, wherein the structure is formed from infrared transmissive material.

20. The antenna cap assembly of claim 17, wherein the first exterior surface is formed an infrared transmissive material.

21. The antenna cap assembly of claim 19, wherein a portion of the first exterior surface is polished to enable infrared communications.

22. A cap assembly for wireless communications on a handheld computer, the handheld computer comprising a housing having a first exterior shell, a second exterior shell, and a frame positioned between the first exterior shell and the second exterior shell, the first exterior shell, the second exterior shell and the frame combining to house at least a printed circuit board, a processor and a memory, the housing providing a display, the cap assembly comprising:

a structure having a length extending along a first axis and a height extending along a second axis that is orthogonal to the first axis, the structure including a first exterior surface, a fir strip and a second strip, the first exterior surface extending along the first axis, the first strip and the second strip each extending along the first axis and having a thickness along the second axis, the first strip being dimensioned to adjoin an interior of the first exterior shell, the second strip being dimmed to adjoin an interior of the second exterior shell, the structure including an interior partially enclosed by the first exterior surface, the first strip and the second strip to form an opening extending along the length of the housing cap opposite to the fist exterior surface, the opening being dimensioned to accommodate an antenna element and segment of the frame for the handheld computers the structure being configured to enable infrared communications;

an antenna element electrically coupleable to the printed circuit board and housed within the structure; and an infrared communicator electrically coupleable to the printed circuit board to extend infrared communications through the structure.

23. A cap assembly for wireless communications on a handheld computer, the handheld computer comprising a housing having a first exterior shell, a second exterior shell, and a frame positioned between the first exterior shell and the second exterior shell, the first exterior shell, the second exterior shell and the fame combining to house at least a printed circuit board, a processor and a memory, the housing providing a display, the cap assembly comprising:

a first structure having a length extending along a first axis and a heist extending along a second axis that is orthogonal to the first axis, the first structure including a first exterior surface, a first strip and a second strip, the first exterior surface extending along the fist axis, the fir strip and the second strip each extending along the first axis and having a thickness along the second axis, the fist strip being dimensioned to adjoin an interior of the first exterior shell, the second strip being dimensioned to adjoin an interior of the second exterior shell, the first structure including an interior partially enclosed by the first exterior surface, the first strip and the second strip to form an opening extending along the length of the housing cap opposite to the first exterior surface, the opening being dimensioned to accommodate an antenna element and a segment of the Mane for the handheld computer;

an interior structure positioned within the first structure;

said antenna element electrically coupleable to the completed circuit board and housed within the first structure; and an infrared communicator electrically coupleable to the printed circuit board to extend infrared communications through the first structure and the interior structure;

wherein the first structure and the interior structure are configured to enable infrared communications extended from the infrared communicator.

24. The cap assembly of claim 23, wherein the first structure is formed from infrared transmissive material, and the interior structure is clear.

25. The cap assembly of claim 24, wherein the first structure is clear, and the interior structure is formed from infrared transmissive material.

* * * * *

UNITED STATES PATENT AND TRADEMARK OFFICE
CERTIFICATE OF CORRECTION

PATENT NO. : 6,456,247 B1
DATED : September 24, 2002
INVENTOR(S) : Hulick et al.

It is certified that error appears in the above-identified patent and that said Letters Patent is hereby corrected as shown below:

Column 10,
Line 3, replace "clam" with -- claim --.
Line 11, replace "if" with -- of --.
Line 49, replace "or" with -- for --; and
Line 62, replace "ship" with -- strip --.

Column 11,
Line 32, replace "fir" with -- first --;
Line 37, replace "dimmed" with -- dimensional --; and
Line 42, replace "fist" with -- first --.

Column 12,
Line 9, replace "fame" with -- frame --;
Line 14, replace "heist" with -- height --;
Lines 17 and 20, replace "fist" with -- first --;
Line 18, replace "fir" with -- first --;
Line 28, replace "Mane" with -- first frame --.

Signed and Sealed this

Twenty-second Day of July, 2003

JAMES E. ROGAN
*Director of the United States Patent and Trademark Office*